United States Patent [19]
Wright

[11] Patent Number: 5,926,790
[45] Date of Patent: Jul. 20, 1999

[54] PILOT/CONTROLLER/VEHICLE OR PLATFORM CORRELATION SYSTEM

[75] Inventor: Brian T. Wright, Cedar Rapids, Iowa

[73] Assignee: Rockwell International, Costa Mesa, Calif.

[21] Appl. No.: 08/924,293

[22] Filed: Sep. 5, 1997

[51] Int. Cl.⁶ .............................. G10L 5/06; G10L 9/00
[52] U.S. Cl. .......................................................... 704/275
[58] Field of Search .................................... 704/275, 274, 704/270, 231, 251, 246

[56] References Cited

U.S. PATENT DOCUMENTS

| | | | |
|---|---|---|---|
| 4,507,750 | 3/1985 | Frantz et al. | 704/275 |
| 4,725,956 | 2/1988 | Jenkins | 704/275 |
| 5,017,930 | 5/1991 | Stoltz et al. | 342/465 |
| 5,240,207 | 8/1993 | Eiband et al. | 244/190 |
| 5,371,901 | 12/1994 | Reed et al. | 455/69 |
| 5,374,932 | 12/1994 | Wyschogrod et al. | 342/36 |
| 5,465,401 | 11/1995 | Thompson | 455/89 |
| 5,519,618 | 5/1996 | Kastner et al. | 364/439 |
| 5,554,990 | 9/1996 | McKinney | 342/36 |
| 5,680,524 | 10/1997 | Maples et al. | 395/127 |

*Primary Examiner*—Susan Wieland
*Attorney, Agent, or Firm*—Kyle Eppele; James P. O'Shaughnessy

[57] ABSTRACT

A control system for aiding the operator of a vehicle or platform, such as an aircraft. The system includes a receiver adapted to receive a voice command from a controller located remotely from the vehicle or platform. A speech recognition device is coupled to the receiver and adapted to compare the voice command to speech recognition templates of known voice commands. A match between the voice command and a speech recognition template is indicative of informational content of the voice command. A display device coupled to the speech recognition device displays to the operator of the vehicle or platform a visual representation of the informational content of the voice command.

20 Claims, 2 Drawing Sheets

PILOT/CONTROLLER/VEHICLE OR PLATFORM CORRELATION SYSTEM

FIELD OF THE INVENTION

The present invention relates generally to vehicle or platform controller systems in which an operator of the vehicle or platform receives voice commands from a controller. More particularly, the present invention relates to a system which improves interpretation of voice commands in controlled applications.

BACKGROUND OF THE INVENTION

In many situations, an operator of a vehicle or platform converses with an external controller using radio communications. Frequently, while receiving the controller's directions or commands, the instructions are not understood by the vehicle or platform operator or are confused upon initial reception. For example, during flight or approach to an airport, the pilot of an aircraft can misconstrue or fail to properly understand a ground controller's directions. This can be a particular problem during international flights in which the pilot and the controller may face a language barrier. Obviously, this presents an undesirable and potentially dangerous situation.

Miscommunication between a controller and the vehicle or platform operator can occur in many other situations. For example, miscommunication can occur between the operator of a train and a controller. Also, miscommunication between the operator of a stationary oil rig platform and a controller can occur. Consequently, a system which could overcome these difficulties in a variety of vehicles or other types of platforms would be a significant improvement in the art.

SUMMARY OF THE INVENTION

A control system for aiding the operator of a vehicle or platform such as an aircraft is disclosed. The system includes a receiver adapted to receive a voice command from a controller located remotely from the vehicle or platform. A speech recognition device is coupled to the receiver and adapted to compare the voice command to speech recognition templates of known voice commands. A match between the voice command and a speech recognition template is indicative of informational content of the voice command. A display device coupled to the speech recognition device displays to the operator of the vehicle or platform a visual representation of the informational content of the voice command.

In some embodiments of the present invention, the informational content of the voice command is compared to known environmental conditions such as the vehicle or platform operator's acknowledgement of the voice command and/or control settings of the vehicle or platform controls. If the comparison indicates a problem, an alert message and/or corrective instructions are generated and presented to the operator. In other embodiments of the present invention, the operator of the vehicle or platform can control a data-to-speech converter to convert a digitized version of the voice command back into speech. In this manner, the voice command can be repeated as often as needed and at a speed which facilitates comprehension by the operator of the vehicle. The present invention applies to digitally and analog encoded and stored voice commands.

DETAILED DESCRIPTION OF THE PREFERRED EMBODIMENTS

Figure 1:
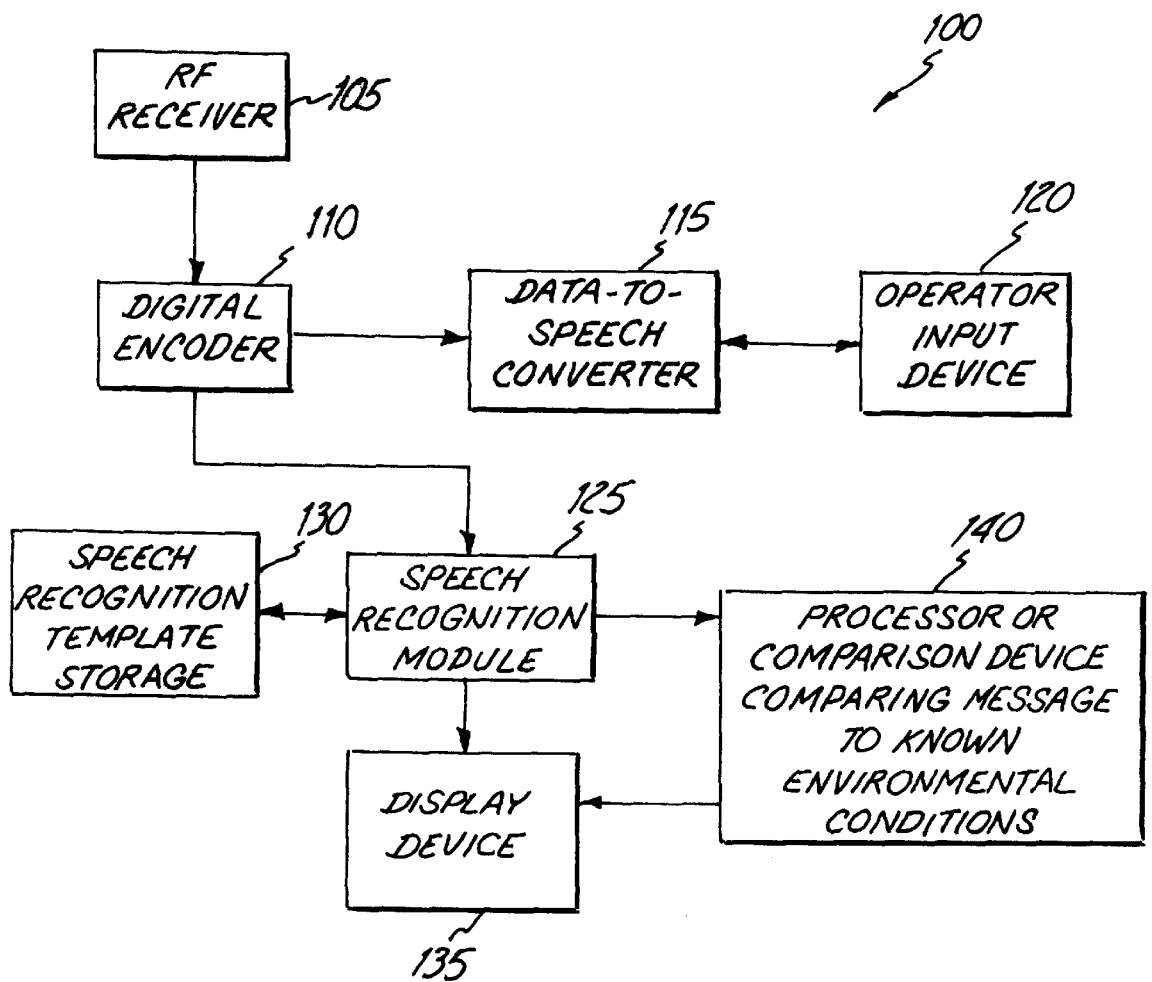
FIG. 1 is a block diagram illustrating one preferred embodiment of a controller-operator correlation system in accordance with preferred embodiments of the present invention.

FIG. 1 is a block diagram illustrating system 100 adapted to receive verbal commands or instructions from a controller, correlate the received commands to known command templates, and display or audibly replay the commands at times and in formats most beneficial to the operator of a vehicle or other platform. While the present invention applies to controlled stationary platforms, such as oil rigs, it is described primarily with reference to controlled non-stationary platforms such as airplanes and other vehicles.

In the preferred embodiment illustrated in FIG. 1, system 100 includes RF receiver 105, digital encoder 110, data-to-speech converter 115, operator input device 120, speech recognition module 125, speech recognition template storage device 130, display device 135 and processor or comparison device 140.

RF receiver 105 is a radio communication device of the type known in the art which is adapted to receive incoming voice commands or instructions transmitted by a controller. RF receiver 105 receives the voice transmission and converts the received electromagnetic signal into analog or digital information. Digital encoder 110 is coupled to RF receiver 105 and receives the signal, corresponding to the command from the controller, from RF receiver 105. Digital encoder 110 digitizes the signal and stores the signal in associated memory.

Data-to-speech converter 115 is coupled to digital encoder 110 and its associated memory. Also coupled to converter 115 is operator input device 120. With the voice command from the controller digitized and stored in memory, the operator of the vehicle can instruct data-to-speech converter 115 to repeat the voice command in an audible format by generating a control signal with the aid of operator input device 120. For example, operator input device 120 can be a push button or other switch adapted to generate a control signal when actuated by the operator of the vehicle. Thus, with the aid of RF receiver 105, digital encoder 110, data-to-speech converter 115 and operator input device 120, incoming voice commands or directions can be repeated in an audible format to aid in comprehension by the vehicle operator. Since the digitized version of the voice command is stored in memory, the command can be repeated as many times necessary. Further, the stored voice command can be replayed at full or reduced speeds to aid in operator comprehension of the command.

Digital encoder 110 and its associated memory are also coupled to speech recognition module 125. Digital encoder 110 and its associated memory provide the digitally encoded voice command signal to speech recognition module 125. Speech recognition module 125 can be, for example, a speech recognition algorithm implemented by a microprocessor or other controller. Speech recognition module 125 rapidly processes the digitally encoded voice commands.

In some preferred embodiments, the processing of the digitally encoded voice commands by speech recognition module 125 includes comparing the digitized voice command signal to known or preprogrammed templates corresponding to commonly received voice commands. The templates are thus indicative of the informational content of known voice commands. These templates can be stored in speech recognition template storage 130. Once a match between the digitized voice command signal and a known template is made, either the template or the digitized voice command signal are converted to a textual or icon format. Conversion of the template or the digitized signal into the textual or icon format can be implemented within speech recognition module 125, or within electronic circuitry associated with display device 135 coupled to speech recognition module 125. The resulting visually formatted message corresponding to the received voice command is presented to the operator of the vehicle within seconds of its initial receipt via display device 135. With the message displayed visually to the operator of the vehicle, comprehension of the incoming voice command is greatly enhanced. This is particularly true in situations where the operator of the vehicle and the controller face a language barrier as is often the case in international flights of aircraft. In this instance, the speech recognition module can translate the message from the language in which the voice command is received into the written language with which the vehicle operator is most comfortable.

Speech recognition module 125 is also coupled to processor or comparison device 140. Once the digitally encoded signal corresponding to the incoming voice command is matched or correlated with a known voice command template, device 140 compares the message to known environmental conditions of the vehicle. In other words, the message is compared to the current situation of the vehicle or operator. For example, the commands of an air traffic controller would be compared to current conditions of the aircraft, such as altitude or airspeed, to determine if the commands are compatible with the current aircraft situation. Based upon the comparison, if a dangerous or undesirable situation is found to exist, an alert can be sounded and/or a recommended course of action by the operator can be presented.

In some embodiments of the present invention, a comparison is made between the controller's instruction, the vehicle operator's confirmation of the instructions, and the vehicle's control settings or environmental conditions. If all three do not agree, a warning is communicated to the vehicle operator. As shown in FIG. 1, device 140 is coupled to display device 135 in order to implement the alarm or presentation of recommended course of action.

Figure 2:
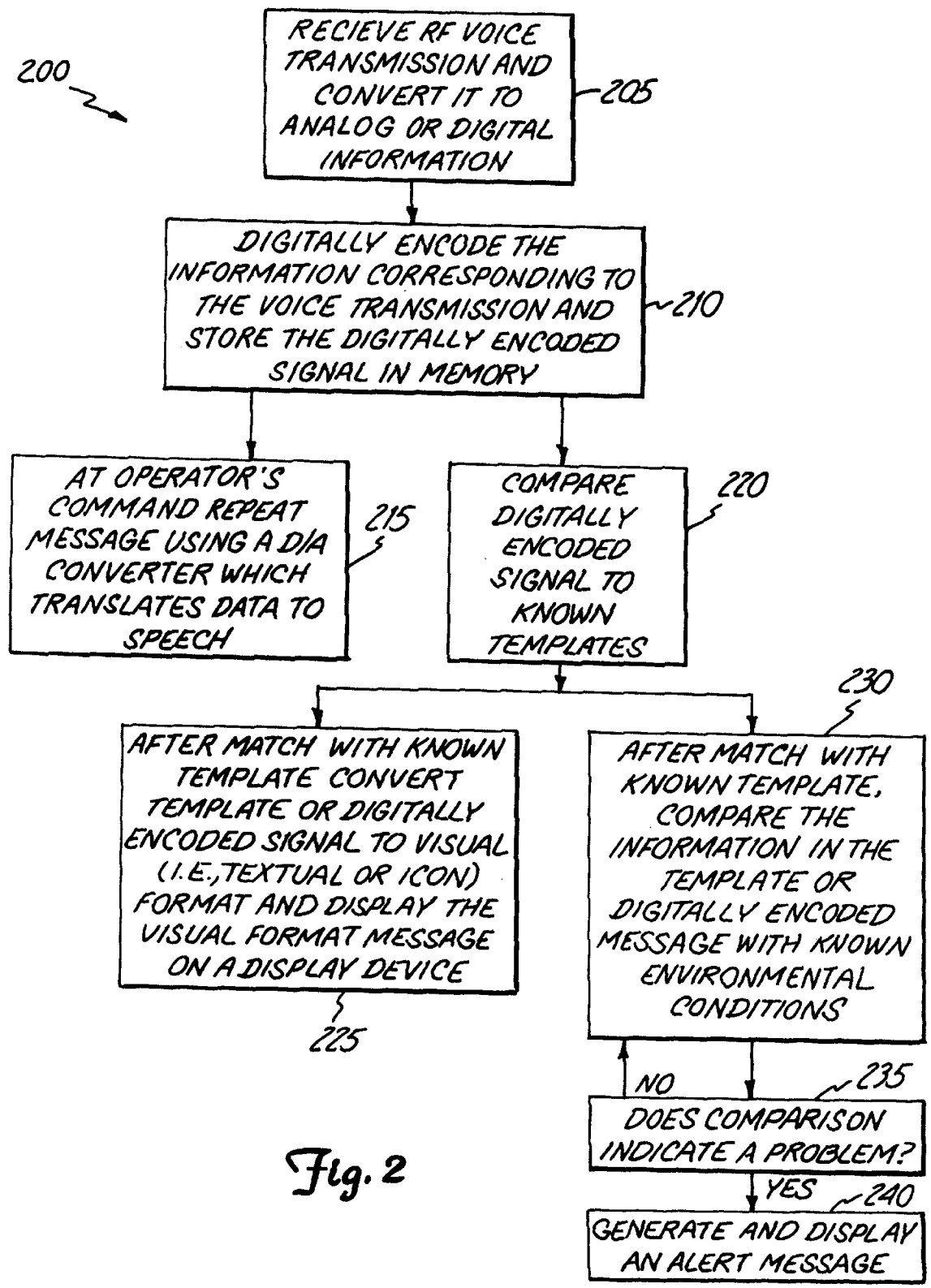
FIG. 2 is a flow diagram illustrating one preferred method of correlating a controller's instructions or commands to information perceived by the operator of a vehicle or other platform.

FIG. 2 is a flow diagram illustrating a method of communicating an incoming voice command message from a controller to the operator of a vehicle in accordance with the preferred embodiments of the present invention. As shown in block 205, the RF voice transmission containing the command or instructions from the controller is received and converted to analog or digital information. At block 210 the information corresponding to the voice transmission is digitally encoded and stored in memory.

At block 215, the message is repeated, at the vehicle operator's command, using a data-to-speech converter which translates data into speech. The voice message stored in the memory device can be replayed by the operator one or more times at the same speed at which it was received or at reduced speed to ensure full comprehension of the details of the message. At block 220, the digitally encoded signal corresponding to the received voice transmission is compared to known templates corresponding to common commands or instructions from controllers. As shown at block 225, after a match is found between a known template and the digitally encoded signal corresponding to the received voice command, the template or the digitally encoded signal is converted into a textual, icon or other visual format. The visually formatted message corresponding to the received voice command or instruction is then displayed on a display device which can be viewed by the operator of the vehicle. With the message displayed in a visual format, the operator's comprehension of the message is greatly enhanced. Further, as discussed above, if the visual format is adapted such that it converts the received message into the operator's preferred language, language barriers between the vehicle operator and the controller can be more easily overcome.

As shown at block 230, also after matching the digitally encoded voice transmission information with a known template, the information or the template are compared with known environmental conditions. The known environmental conditions can include, for example, the current situation of the vehicle or the control settings of the vehicle's controls. Also, the comparison can be made against the vehicle operator's confirmation of the controller's command. If the comparison indicates a problem or that a specific course of action needs to be taken, an alert message and/or instructions are generated and displayed for viewing by the operator as shown in block 240. If the comparison does not indicate a problem, the process is repeated continuously as the message or the environmental conditions change.

The present invention minimizes the occurrence of unsafe conditions frequently existing between a controller and the operator of the vehicle. For example, in the prior art, miscommunication between a pilot and an air traffic controller could result in unsafe conditions even to the point of aircraft loss. Voice recognition technology has improved to the point where the audio communication between the pilot and the controller can be translated into a textual format. In addition to providing a second mode of communicating the message to the pilot, a comparison can be made between the controller's instructions, the environmental conditions of the aircraft or vehicle, and the pilot's confirmation of the message. If all three do not agree, a warning can be communicated to the pilot to inform he or she of the unsafe condition. Further, a proposed course of action can automatically be presented to the pilot.

Although the present invention has been described with reference to preferred embodiments, workers skilled in the art will recognize that changes may be made in form and detail without departing from the spirit and scope of the invention. For example, the present invention can be used in a variety of controller-operator controlled vehicles, as well as in other non-vehicle platforms such as oil rigs and radar installations. The term "platform" as used herein is intended to refer to both vehicles and other stationary and non-stationary controlled structures and apparatus. Further, while the present invention is described primarily with reference to digital encoding, storage and conversion, analog methods can be used as well without departing from the invention.

What is claimed is:

1. A control system for aiding the operator of a platform, the system comprising:

a receiver adapted to receive a voice command from a controller located remotely from the platform;

a speech recognition device coupled to the receiver and adapted to compare the voice command to speech recognition templates of known voice commands, wherein a match between the voice command and a speech recognition template is indicative of informational content of the voice command; and a display device coupled to the speech recognition device and adapted to display to the operator of the platform a visual representation of the informational content of the voice command.

2. The control system of claim 1, wherein the display device displays to the operator of the platform a textual representation of the informational content of the voice command.

3. The control system of claim 2, wherein the voice command from the operator is in a first language and the textual representation of the informational content of the voice command is in a second language.

4. The control system of claim 1, wherein the display device displays to the operator of the platform an icon representation of the informational content of the voice command.

5. The control system of claim 1 and further comprising a comparison device coupled to the speech recognition device and adapted to compare the informational content of the voice command received from the controller to environmental conditions associated with the platform, wherein the comparison device generates a warning signal if the comparison indicates inconsistency between the informational content of the voice command and the environmental conditions associated with the platform.

6. The control system of claim 5, wherein the environmental conditions associated with the platform include control settings of controls of the platform.

7. The control system of claim 5, wherein the comparison device is further adapted to compare the informational content of the voice command received from the controller and the environmental conditions associated with the platform to a confirmation of the voice command made by the platform operator, wherein the comparison device generates a warning signal if the comparison indicates inconsistency between the informational content of the voice command, the environmental conditions associated with the platform and the confirmation of the voice command.

8. The control system of claim 1 and further comprising a digital encoder coupled between the receiver and the speech recognition device, wherein the digital encoder receives from the receiver a signal corresponding to the voice command, digitizes the received voice command signal, and stores the digitized voice command signal in memory, and wherein the speech recognition device compares the digitized voice command signal to digital speech recognition templates of known voice commands.

9. The control system of claim 8 and further comprising:
a platform operator input device adapted to generate a control signal at the operator's request; and
a data-to-speech converter coupled to the digital encoder and to the operator input device, wherein upon receipt of the control signal generated by the operator input device at the operator's request, the data-to-speech converter converts the stored digitized voice command signal into a speech message thereby repeating the voice command from the controller.

10. The control system of claim 9, wherein using the operator input device the operator of the platform can control the speed at which the voice command is repeated by the data-to-speech converter.

11. An aircraft avionics system comprising:
an RF receiver adapted to receive a voice command from a controller located remotely from the aircraft;
a digital encoder coupled to the RF receiver and adapted to digitize and store the voice command;
a pilot input device adapted to generate control signals at the pilot's request; and
a data-to-speech converter coupled to the digital encoder and to the pilot input device, wherein upon receipt of a control signal generated by the input device at the pilot's request the data-to-speech converter converts the stored digitized voice command into a speech message format, thereby repeating the voice command to optimize the pilot's comprehension of the voice command.

12. The aircraft avionics system of claim 11, wherein using the input device the pilot can control the speed at which the voice command is repeated by the data-to-speech converter.

13. The aircraft avionics system of claim 11, and further comprising:
a speech recognition device coupled to the digital encoder and adapted to compare the digitized voice command to speech recognition templates of known voice commands, wherein a match between the digitized voice command and a speech recognition template is indicative of informational content of the voice command; and
a display device coupled to the speech recognition device and adapted to display to the pilot a visual representation of the informational content of the voice command.

14. The aircraft avionics system of claim 13, wherein the display device displays to the pilot a textual representation of the informational content of the voice command.

15. The aircraft avionics system of claim 13, wherein the display device displays to the pilot an icon representation of the informational content of the voice command.

16. The aircraft avionics system of claim 13 and further comprising a comparison device coupled to the speech recognition device and adapted to compare the informational content of the voice command received from the controller to environmental conditions associated with the aircraft, wherein the comparison device generates a warning signal if the comparison indicates inconsistency between the informational content of the voice command and the environmental conditions associated with the aircraft.

17. The aircraft avionics system of claim 16, wherein the environmental conditions associated with the aircraft include control settings of avionics controls of the aircraft.

18. A method of communicating a controller's commands to the pilot of an aircraft, the method comprising:
receiving a voice transmission from the controller, the voice transmission containing a voice command;
digitally encoding the voice command;
comparing the digitally encoded voice command to known digital voice command templates, wherein a match between the digitally encoded voice command and a known digital voice command template is indicative of informational content of the voice command; and
after matching the digitally encoded voice command with a digital voice command template, displaying in a visual format the informational content of the voice command to thereby optimize the pilot's comprehension of the voice command.

19. The method of claim 18 and further comprising:
comparing the informational content of the voice command to known environmental conditions; and
generating an alert message if the comparison of the informational content of the voice command to the known environmental conditions indicates a problem.

20. The method of claim 18 and further comprising:
repeating the voice command at the pilot's request by using a data-to-speech converter to convert the digitally encoded voice command into a speech format message.

* * * * *